US008223009B2

(12) United States Patent  (10) Patent No.: US 8,223,009 B2
Anderson et al. (45) Date of Patent: Jul. 17, 2012

(54) MOBILE ASSET TRACKING SYSTEM AND METHOD

(75) Inventors: Tommie K. Anderson, Milford, OH (US); Robert M. Schwartz, West Chester, OH (US)

(73) Assignee: TRACK America, Cincinnati, OH (US)

( * ) Notice: Subject to any disclaimer, the term of this patent is extended or adjusted under 35 U.S.C. 154(b) by 1463 days.

(21) Appl. No.: 11/803,505

(22) Filed: May 15, 2007

(65) Prior Publication Data

US 2007/0262861 A1 Nov. 15, 2007

Related U.S. Application Data

(60) Provisional application No. 60/800,333, filed on May 15, 2006.

(51) Int. Cl.
*G08B 1/08* (2006.01)
*B60Q 1/00* (2006.01)
*G06Q 50/00* (2012.01)

(52) U.S. Cl. ............. 340/539.1; 340/539.13; 340/425.5; 340/525; 340/531; 340/540; 340/572.1; 705/6; 705/13; 235/384

(58) Field of Classification Search ................. 340/539.1
See application file for complete search history.

(56) References Cited

U.S. PATENT DOCUMENTS

| | | | |
|---|---|---|---|
| 5,428,546 A | 6/1995 | Shah et al. | |
| 5,515,043 A | 5/1996 | Berard et al. | |
| 5,638,519 A | 6/1997 | Haluska | |
| 5,712,789 A | 1/1998 | Radican | |
| 5,828,322 A | 10/1998 | Eberhard | |
| 6,240,362 B1 | 5/2001 | Gaspard, II | |
| 6,281,797 B1 | 8/2001 | Forster et al. | |
| 6,611,755 B1 | 8/2003 | Coffee et al. | |
| 6,892,131 B2 | 5/2005 | Coffee et al. | |
| 6,975,224 B2 | 12/2005 | Galley, III et al. | |
| 7,027,808 B2 | 4/2006 | Wesby | |
| 7,218,227 B2 | 5/2007 | Davis et al. | |
| 7,250,855 B2 * | 7/2007 | Suenbuel et al. | 340/511 |
| 2005/0203683 A1 * | 9/2005 | Olsen et al. | 701/35 |
| 2005/0205719 A1 | 9/2005 | Hendrickson et al. | |
| 2006/0047379 A1 | 3/2006 | Schullian et al. | |
| 2006/0047419 A1 | 3/2006 | Diendorf et al. | |
| 2006/0047543 A1 | 3/2006 | Moses | |
| 2006/0173721 A1 * | 8/2006 | Gregg | 705/6 |

* cited by examiner

*Primary Examiner* — Donnie Crosland
(74) *Attorney, Agent, or Firm* — Ryndak & Suri, LLP

(57) ABSTRACT

A mobile asset tracking system receives telemetry information from any number of mobile assets (e.g., railcars, truck trailers, intermodal cargo containers, etc.) transporting hazardous or non-hazardous materials. Location data is obtained through GPS satellite locks and is transmitted via a cellular module to a central database for processing. Business rules in the software of the system trigger proactive alert communications to subscribers through common communication protocols such as email, SMS text, and pagers. Personal Computers, Personal Digital Assistants (PDA's), cell phones or other common communication devices widely available to consumers may be utilized for receipt of alerts. Subscribers may be defined as manufacturers of materials, consignees who receive materials, transporters of materials (e.g. railroads, trucking companies, etc.) and communities such as county, state and/or federal emergency management personnel. GIS mapping software is utilized for geographical display of assets to authorized subscribers.

51 Claims, 8 Drawing Sheets

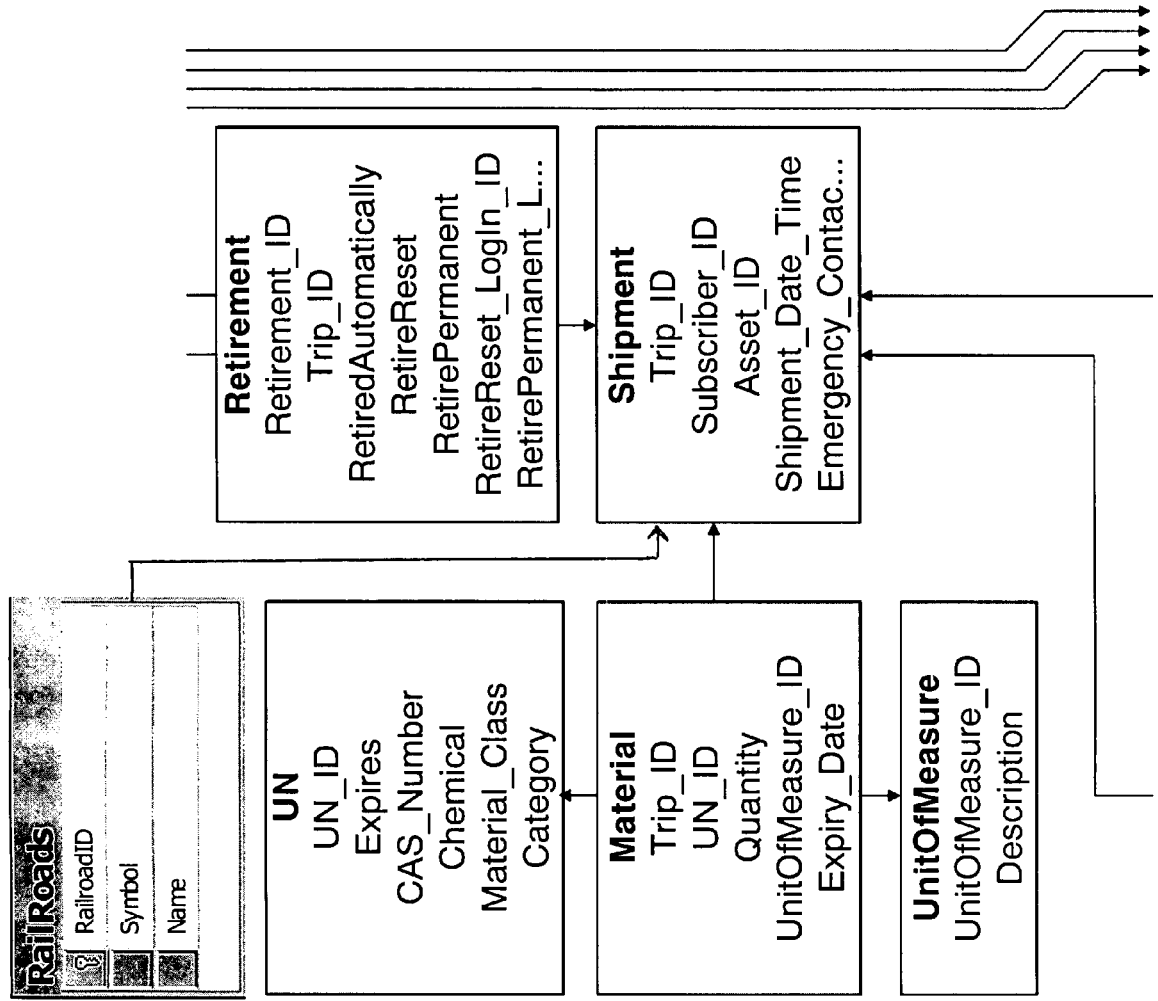

MOBILE ASSET TRACKING SYSTEM AND METHOD

RELATED APPLICATION

This application claims the benefit of U.S. Provisional Application No. 60/800,333, filed May 15, 2006.

FIELD OF THE INVENTION

The present invention relates generally to systems and methods for tracking mobile assets. In particular, the invention relates to systems and methods for tracking mobile assets such as railcars, truck-trailers and intermodal freight containers transporting hazardous or non-hazardous materials.

BACKGROUND OF THE INVENTION

Many types of materials are shipped via rail and truck from manufacturer to user, requiring large fleets of railcars, trucks and cargo containers. Those materials include hazardous materials such as chemicals, which raises safety and environmental concerns. Therefore, a system that can prevent hazardous material incidents by tracking shipments from sender to receiver and reporting real-time position and alert information via web mapping software is highly desirable for material manufacturers, shippers and the communities through which the shipments pass.

SUMMARY OF THE INVENTION

In accordance with the present invention, a mobile asset tracking system receives telemetry information from any number of mobile assets (e.g., rail cars, truck trailers, intermodal cargo containers, etc.) transporting hazardous or non-hazardous materials. Location data is preferably obtained through Global Positioning System ("GPS") satellite locks and is transmitted wirelessly, e.g., via a cellular module, to a central monitoring system with a database for storing and processing the data. Business rules in the software of the monitoring system trigger proactive alert communications to subscribers through common communication protocols such as email, SMS text, and pagers. Personal computers, Personal Digital Assistants (PDA's), cell phones or other common communication devices widely available to consumers may be utilized for receipt of alerts. Subscribers may include manufacturers of materials, manufacturers and other consignees who receive materials, transporters of materials (e.g., railroads, trucking companies, etc.) and communities such as county, state and/or federal emergency management personnel. Geographic Information System ("GIS") mapping software is utilized for geographical display of assets to authorized subscribers.

In accordance with a preferred embodiment of the invention, a mobile asset tracking system comprises a plurality of tracking units, each being adapted for mounting to a mobile asset of a system subscriber, and a monitoring system. The tracking unit includes a position location device, at least one communication device for telemetry data transmission, a battery, a processor and a firmware program for enabling communication between the position location device and the communication device and for controlling a communication interval of the communication device with the monitoring system and a position lock interval of the position location device. The monitoring system includes a port listener for receiving telemetry data from the communication devices of the tracking units, the telemetry data including the position of the mobile asset as determined by the position location device; a database for receiving and storing telemetry data from the port listener; a database rules engine for deriving asset and shipment cargo information from the telemetry data in the database and generating alerts based on the asset information and defined rules; an interface program for interacting with the database rules engine and sending alerts to the system subscriber; and a graphical user interface (GUI) which may be accessed by the system subscriber via a secure internet connection.

In another aspect, the monitoring system of the invention has a system architecture including at least one central server for storing application programs, subscriber master data and configurations for the subscriber; a database management system (DBMS) utilizing a relational database; Internet Information Services (IIS) for allowing the subscriber to access the system through Web-enabled applications, and Graphical Information System (GIS) mapping software for graphical display of the subscriber's mobile asset being tracked.

In another aspect, the invention provides a method for tracking mobile assets containing hazardous chemical cargo and includes (i) providing a series of software business rules to monitor the characteristics of the hazardous chemical cargo; (ii) providing a graphical user interface having a series of screens for entry of hazardous chemical cargo data; and (iii) providing a series of alerts triggered by application of the business rules against the hazardous chemical cargo data.

In yet another aspect, the invention provides a method for tracking mobile assets containing hazardous chemical cargo includes (i) providing a series of software business rules to monitor logistics data; (ii) providing a graphical user interface having a series of screens for entry of logistics data; and (iii) providing a series of alerts triggered by application of the business rules against the logistics data.

DETAILED DESCRIPTION OF THE INVENTION

Figure 1:
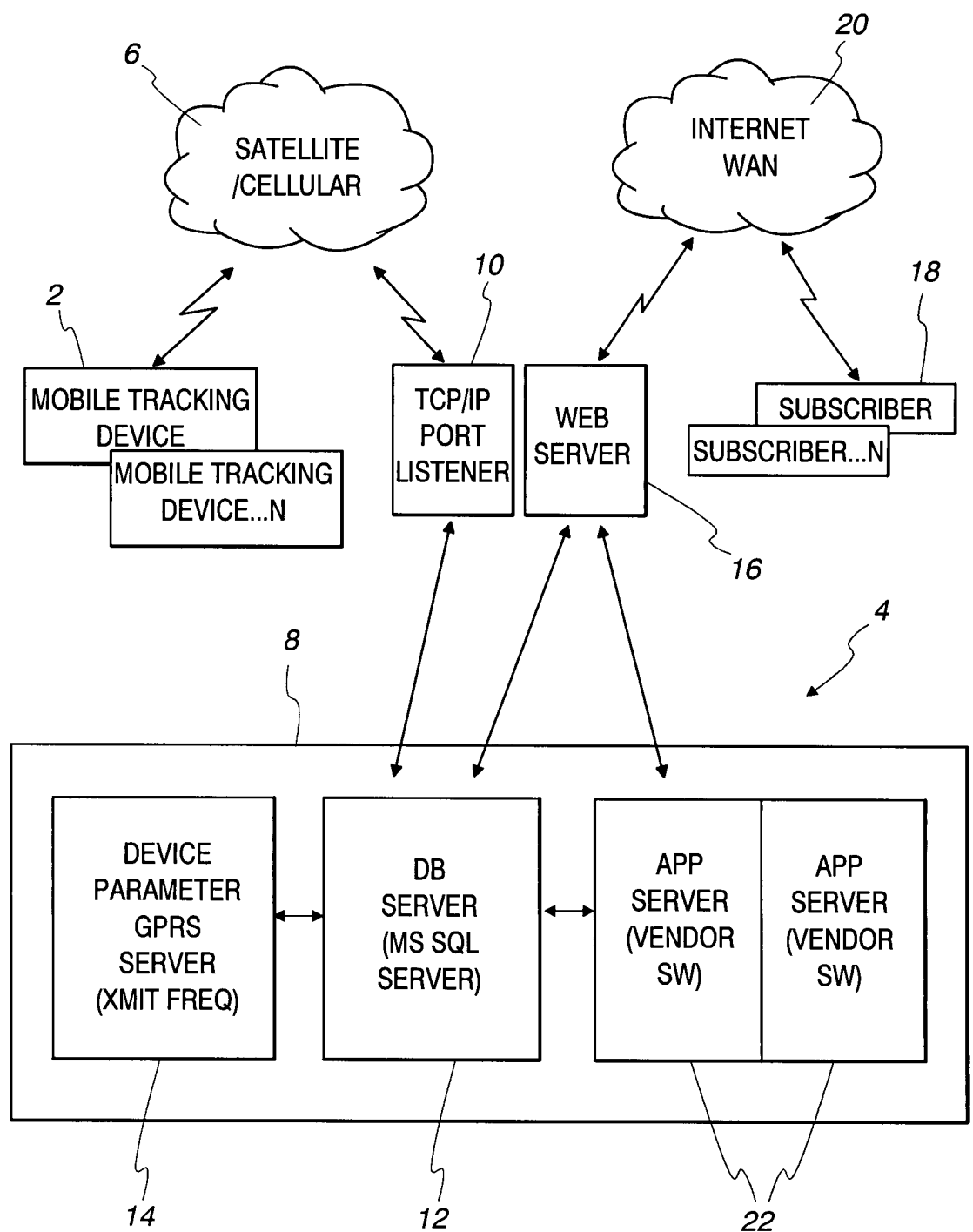
FIG. 1 is a block diagram of the system of the invention.

As shown in FIG. 1, the system of the invention includes any number of mobile tracking devices 2. A mobile tracking device 2 is affixed to a mobile asset such as a railcar, truck trailer, intermodal cargo container, etc., and tracks the position of the mobile asset. Tracking device 2 has a protective outer encasement for housing of electronic components. The outer encasement may be made of any suitable material such as high-impact plastic or metal. Magnets or other attachment means are affixed to the encasement for attaching the encasement to the mobile asset. For example, a magnetic mount consisting of a steel plate with four industrial strength magnets affixed to the steel plate via stainless steel bolts may be used.

The encasement and attachment means may be specially adapted for the type of mobile asset with which the device will be used. For example, a device to be used with a rail tank car may be curved to conform to the cylindrical profile of the tank. A water-resistant internal enclosure of plastic or another suitable material may be provided to protect the internal electronic components, with access points in the internal case for antenna connection and power cable feeds.

The system operator pre-assigns a unique device ID code to each tracking unit 2. A label with the unique device ID code (and optionally, a barcode) is affixed on the outside of each mobile tracking device enclosure.

The internal electronic components include a GPS positioning module with antenna (such as an EM-406 SiRFIII GPS Engine Board from USGlobalsat, Inc.), a satellite or cellular communication module with antenna for data communications (such as a Model GM862-Quad cellular module from Telit Communications S.p.A.), firmware for control of the GPS and satellite/cellular components, a flash memory for storage of the firmware including device configuration data, and a power coupling for connection to a power supply. The GPS module may be provided with a lithium battery to maintain its operation if the main power supply is interrupted. Preferably, all of these components are mounted on a main circuit board, e.g., an "Uber" board (such as an LPC-U2138 from Spark Fun Electronics of Boulder, Colo.) for integration of all components. Preferably, the flash memory can be remotely "reflashed" to install new or updated firmware.

Either an internal or external power supply may be utilized for tracking device 2. The internal power supply may be of either of two configurations, either a disposable battery of a suitable type and configuration to power the mobile tracking device 2; or, preferably, a re-chargeable battery that is recharged by solar cells mounted on the exterior of the outer protective encasement. In the latter case, a float charger is provided to prevent overcharging of the battery by the solar cells. In the case of an external power supply, a power cable from the main circuit board is fed through a water-tight opening in the outer encasement, connecting to the mobile asset's internal power supply.

The firmware preferably includes a power management component that monitors the battery voltage. If the voltage drops below a pre-set level, the power management component will disable operation of the communication device while maintaining power to the position location device for obtaining position locks, until the solar panel has recharged the battery to a nominal power threshold. Once the solar panel has recharged the battery to an acceptable voltage level, the original communication interval is restored.

Mobile tracking device 2 transmits location data based on configurable parameters for: (1) a timeframe in which the GPS module activates and achieves a location lock from satellites, and (2) a timeframe in which the cellular module activates and transmits all location data from the GPS module's stored location data. Location data is stored internally in a circular file awaiting transmission by the mobile tracking device's cellular module. Once the cellular module completes data transmission the circular file is cleared and awaits the next set of GPS data lock information from the internal GPS module. Both the GPS lock interval or frequency and the cellular transmit interval or frequency may be remotely changed.

Preferably, the GPS module employs the Wide Area Augmentation System (WAAS) which provides additional accuracy, integrity and availability. The WAAS specification states that it provides a position accuracy of 7.6 meters or better at least 95% of the time, but actual performance has been shown to be even better. Even more preferably, the system provides a further enhancement of the GPS/WAAS system by transmitting multiple position fixes in one transmission, discarding the outliers in the data, and averaging the remaining data. For example, the GPS module may take 40 position lock reads and transmit the last ten to the monitoring system (WAAS requires approximately 30 locks for acceptable accuracy). The system discards anomalies and outliers, takes the remaining data readings and averages them (or applies other appropriate statistical techniques) to arrive at a final position. Using this approach has been shown to yield a position reading that is accurate to within 10 feet or less.

Each mobile tracking device 2 transmits data to a central monitoring system 4 through commonly used cellular or satellite data transmission technologies 6. Monitoring system 4 has a central server 8 which has a continuous running process (referenced as a TCP/IP port listener 10) that listens for data communications from tracking devices 2 in the environment. Once port listener 10 receives a mobile tracking device's information a separate process is initiated on central server 8 to process all location data transmitted by mobile tracking device 2, placing the data into the system's database.

The software of the inventive system is preferably a combination of off-the-shelf Geographic Information System ("GIS") software and custom-designed program code designed to receive and process location data from remote tracking devices 2. Architecturally, monitoring system 4 consists of the hardware and software components shown in FIG. 1. Central server 8 provides storage of all data and application programs, and includes a database server with a database management system 12, such as Microsoft SQL Server; a device parameter GPRS server 14 for remotely controlling the GPS lock interval and cellular communication interval (transmission frequency) of tracking devices 2; a Web server 16, e.g., Internet Information Services ("IIS") that allow subscribers 18 to access the system through Web enabled services, via a wide area network (WAN) 20 such as the Internet; and one or more application servers 22 running various applications, including GIS mapping software, such as Manifold System software available from CDA International Ltd. or Google Enterprise API mapping solution.

The GIS mapping software provides rendering of tracked mobile assets on a map on a subscriber's display via two different methods. In a first method, the software associates a mobile tracking device 2 with subscriber 18 who owns the mobile asset to which the mobile tracking device 2 is attached. The mobile asset may be a railcar, truck trailer, automobile, intermodal cargo container, etc. Once associated, tracking device 2 is linked to that subscriber 18 until the association is broken. Once tracking device 2 is associated with the subscriber 18, only that subscriber 18 can request that the devices be rendered on a map. Once the asset(s) are rendered on a map, the subscriber can "hover" the computer mouse over an asset on the screen for a display of key asset information, which may be displayed in a pop-up window on the user's screen. This information may include, inter alia, chemical type, hazard class, loaded weight, or any number of configurable characteristics of the asset or the shipment cargo.

In a second method, community (local, state and/or federal) authorities such as emergency management personnel that have an interest in hazardous chemicals or other shipments of interest which pass through or near the community become subscribers to the system. This subscriber base will not own the mobile asset, but will have a geo-fence defined that encompasses a boundary of interest. This boundary may be defined as, e.g., a county, series of contiguous counties, state, and/or region. Once a mobile asset of interest "breaks" the subscriber's geo-fence, that subscriber and/or subscriber's delegate(s) will be proactively alerted by the software. The subscriber will then access the software and request map rendering of the asset(s) within their defined geo-fence. The software also alerts a subscriber that has a defined geo-fence that an asset of interest is due to enter their geo-fence.

Figure 2:
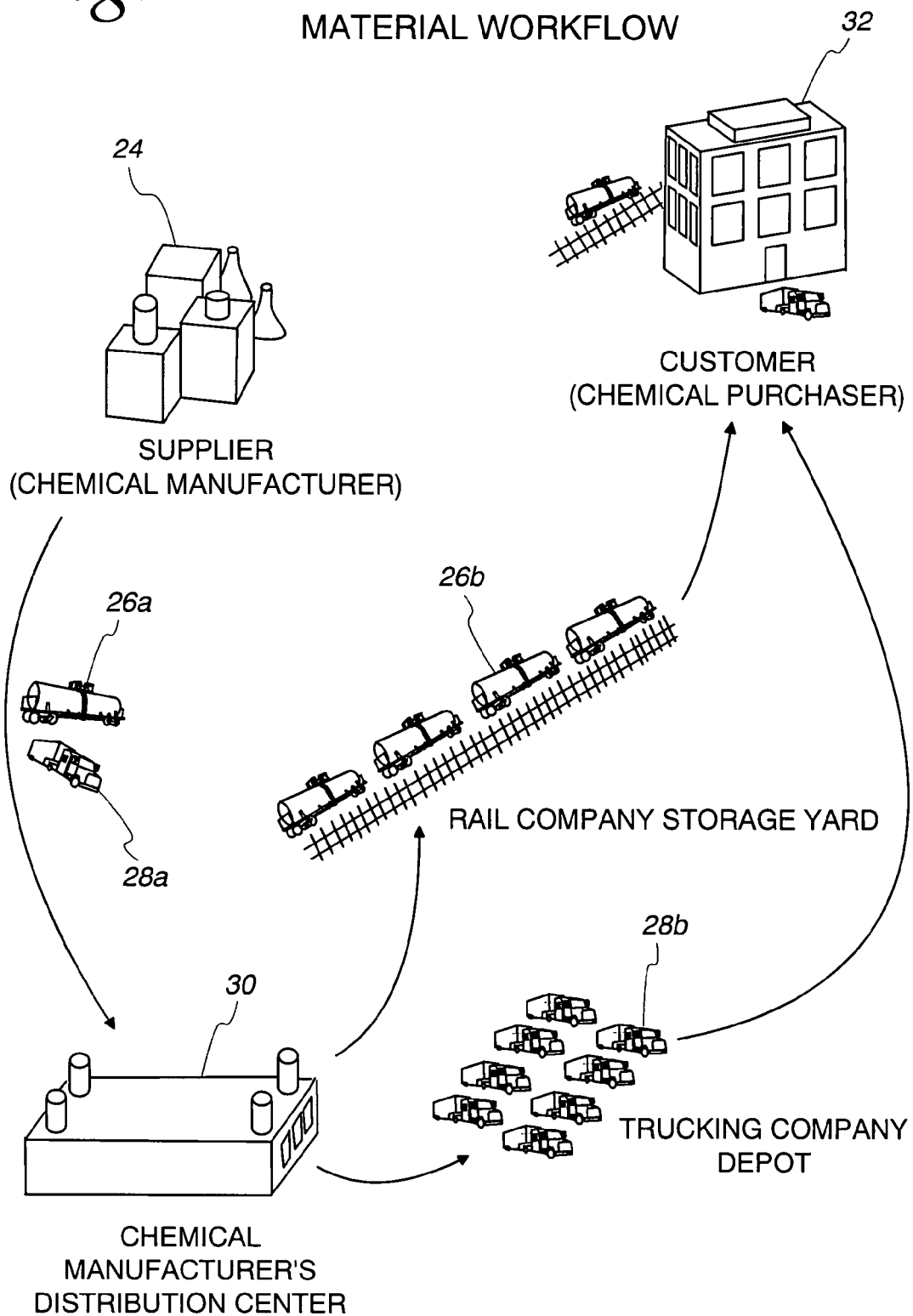
FIG. 2 is an illustration of the material workflow targeted by the invention.

As shown in FIG. 2, the system and method of the invention can track and monitor material throughout its entire workflow, e.g., from a supplier to a distributor to an end customer, each of whom may be a subscriber to the system. Supplier 24 may be, for example, a chemical manufacturer. Chemical material is first shipped via railcar 26a or truck trailer 28a to a distributor 30. From there, the chemical material may be shipped to a consignee, who may be the end customer 32, such as a chemical purchaser. Again, shipment may be via railcar 26b or truck trailer 28b. Although not shown in FIG. 2, communities along the routes between the manufacturer 24 and distributor 30, and between distributor 30 and customer 32, may also monitor the position and status of the railcar 26 or truck trailer 28 while within their defined geo-fence, as described above.

An important aspect of the design of the software of the invention lies in its business rules. Business rules monitor all mobile asset location data and proactively determine if an alert should be generated. The system is especially useful for tracking shipments of hazardous chemicals, but is not by design limited to tracking only hazardous chemicals. The system preferably utilizes industry standards for hazardous chemical identification. These identification methods are the chemical's United Nations ID number ("UNID number") and/or Chemical Abstracts Service Registry Number ("CAS Number"), and the Hazard Class for the chemical as defined by the U.S. Department of Transportation Hazardous Materials Table (CFR Part 49).

Representative business rules are defined below, and their respective functions listed:

Inhibitor Date Check/Alert. Certain chemicals contain an inhibitor to prevent premature polymerization; however, the inhibitor itself has a defined life span. A business rule is provided to monitor the inhibitor expiry date and alert the subscriber at predefined intervals as the inhibitor approaches expiration.

Alerts based on population density. The application is designed to send alerts to subscribers if a mobile asset (e.g. railcar) containing a selected hazard class of material, or other cargo of interest, enters or is about to enter a geographic area having a certain population density, e.g., a High Threat Urban Area ("HTUA") as defined by the United States Department of Homeland Security.

Alerts based on mobile asset in relation to schools or other facilities. The application is designed to send alerts when a mobile asset (e.g. railcar) containing a selected hazard class of material, or other cargo of interest, is within a certain distance of a school, hospital, or other facility.

Special alerts for "Extremely Hazardous Substances." There are approximately 300 materials designated by the U.S. Environmental Protection Agency as Extremely Hazardous Substances, which form a subset of the table of hazardous materials listed in the CFR Part 49 table. The application has specific business rules to monitor and alert subscribers of chemicals labeled as Extremely Hazardous Substances.

Special alerts for "Toxic Inhalation Hazard" (TIH) or "Poisonous Inhalation Hazard" (PIH) class materials. There are ten TIH materials (gases and volatile liquids) which present an extremely high risk of fatality resulting from a catastrophic release. The application has specific business rules to monitor and alert subscribers of chemicals labeled as TIH or PIH. Of course, business rules can be defined for any other hazard classifications.

Special alerts for non-movement of the mobile asset. The system continuously compares the location position of each mobile asset and alerts the subscriber if the asset has not moved a measurable distance in a pre-determined amount of time. This time frame is configurable within the software application.

Alerts for failure of the tracking device to transmit data. The application continuously compares the latest date-time of each mobile tracking device's transmission and alerts the associated subscriber and the system operator if the unit has not successfully transmitted for a pre-determined amount of time. This time frame is configurable within the software application.

The foregoing examples of business rules are merely illustrative as core rules for the system. Other business rules may be defined as needed for various subscribers, cargoes, etc.

The application software is designed to handle multiple subscriber bases, including, but not limited to, manufacturers of hazardous chemicals or other material, manufacturers or other consignees who receive hazardous chemicals or other material, railroads, trucking companies, and communities. Communities are broadly defined as local, state, and/or federal Emergency Management Agency personnel or other community personnel interested in mobile assets with cargo of interest entering their defined geo-fence.

The application software is also designed to handle batch processes for receipt and processing of location data. Logic built into the batch processes determines if a specific alert condition(s) exists and a notification should be sent to the affected subscriber base.

In addition, the software has the ability to define and manage parent-child relationships for businesses such as corporations. For example, Global Corporation "A" may have multiple manufacturing facilities "B", "C", etc . . . . Global Corporation "A" can see assets for all its child corporations ("B", "C", etc) but the child corporations can only see their own assets.

An alert table allows subscribers to choose the alert condition they are interested in, and allows the subscribers to configure the frequency at which the alert should be sent. An alert configuration screen provides a capability for a subscriber to send a notification from their computing device (computer, PDA, cell phone, etc) back to the system database requesting suppression of the subscriber's specific alert. The alert configuration screen also allows a subscriber to enter multiple subscribers to receive alerts, to select from a pick list the alerts each subscriber will receive, and to select from a pick list of alert frequency parameters for each selected alert.

An alert escalation scheme is preferably provided. For example, a preconfigured alert escalation will occur for TIH cargo if the alert is not addressed by an alarm recipient within a preset time. An example escalation path may be 1) Manufacturer, 2) Railroad carrier, and 3) Local Emergency Management personnel in the locale where the load in question currently resides.

A back-end functionality component is also provided to automatically reset alert frequencies to the appropriate setting based on a cargo's UNID or CAS number, and associated Hazardous Material classification. This is required to protect all parties from receiving alerts deemed to be outside of needed alert frequencies initially set by the user when a device is moved from one railcar to another, or a different shipment is being transported within the same container that is now deemed hazardous.

The system provides a graphical user interface with a series of screens for data entry. A device association screen allows linking a specific tracking device 2 to a subscriber 18. A shipment entry screen permits entry of shipment information including, but not limited to, load type, UNID number or CAS number (if chemical), expiry date of cargo or inhibitor (if applicable), weight of load, shipment destination, expected shipment arrival date, asset type (railcar, truck, automobile, etc.), etc. Auto-retirement of a shipment when the asset is within a pre-determined distance of the ship to location is also provided. For example, when a mobile asset is within one mile of the ship to location, an auto-retirement process may be initiated that will stop alerts from being sent to the subscriber.

Figure 3:
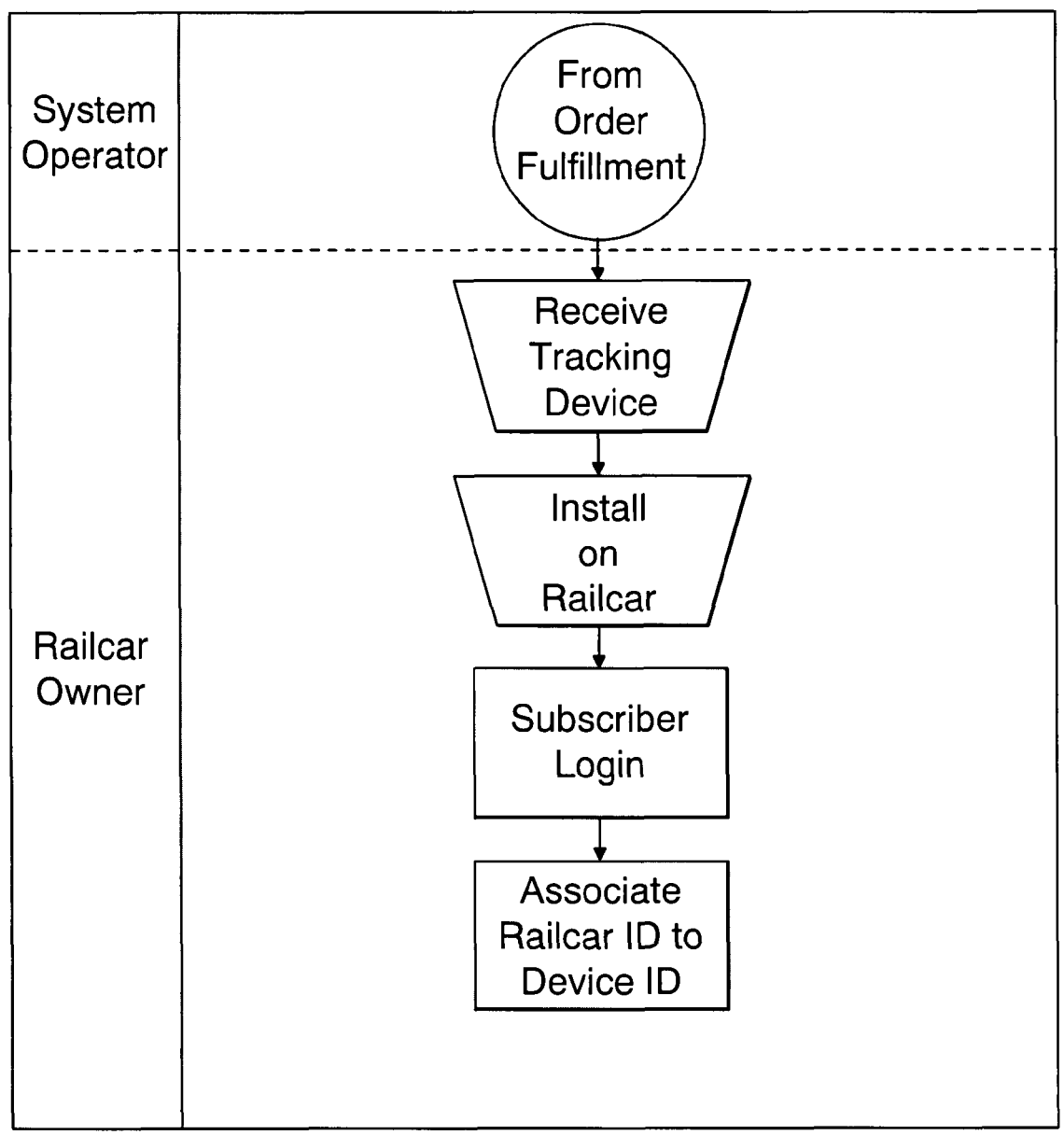
FIG. 3 is a flowchart of the work process for installing and associating a mobile tracking device to a mobile asset.

An example of the process of installing a tracking device 2, associating it with a mobile asset, and entering shipment data will now be described with reference to FIGS. 3 and 4. As shown in FIG. 3, a railcar owner receives delivery of a mobile tracking device after an order is fulfilled by the system operator. The railcar owner may be, e.g., either a chemical manufacturer or a railroad. The railcar owner installs the mobile tracking device on a railcar, e.g., by using a magnet mount or strapping mechanism. An authorized subscriber logs in to the system via web server 16 and the GUI, and enters his Subscriber ID and a password. The system recognizes the subscriber ID and the subscriber's name and ID are displayed. The subscriber railcar owner enters the railcar ID for the installed mobile tracking device. Tracking Device IDs, which are pre-assigned by the system operator, are displayed. The Device ID is provided on a label affixed on the outside of each mobile tracking device enclosure by the system operator. Previously associated railcars will be displayed with their associated device.

Figure 4:
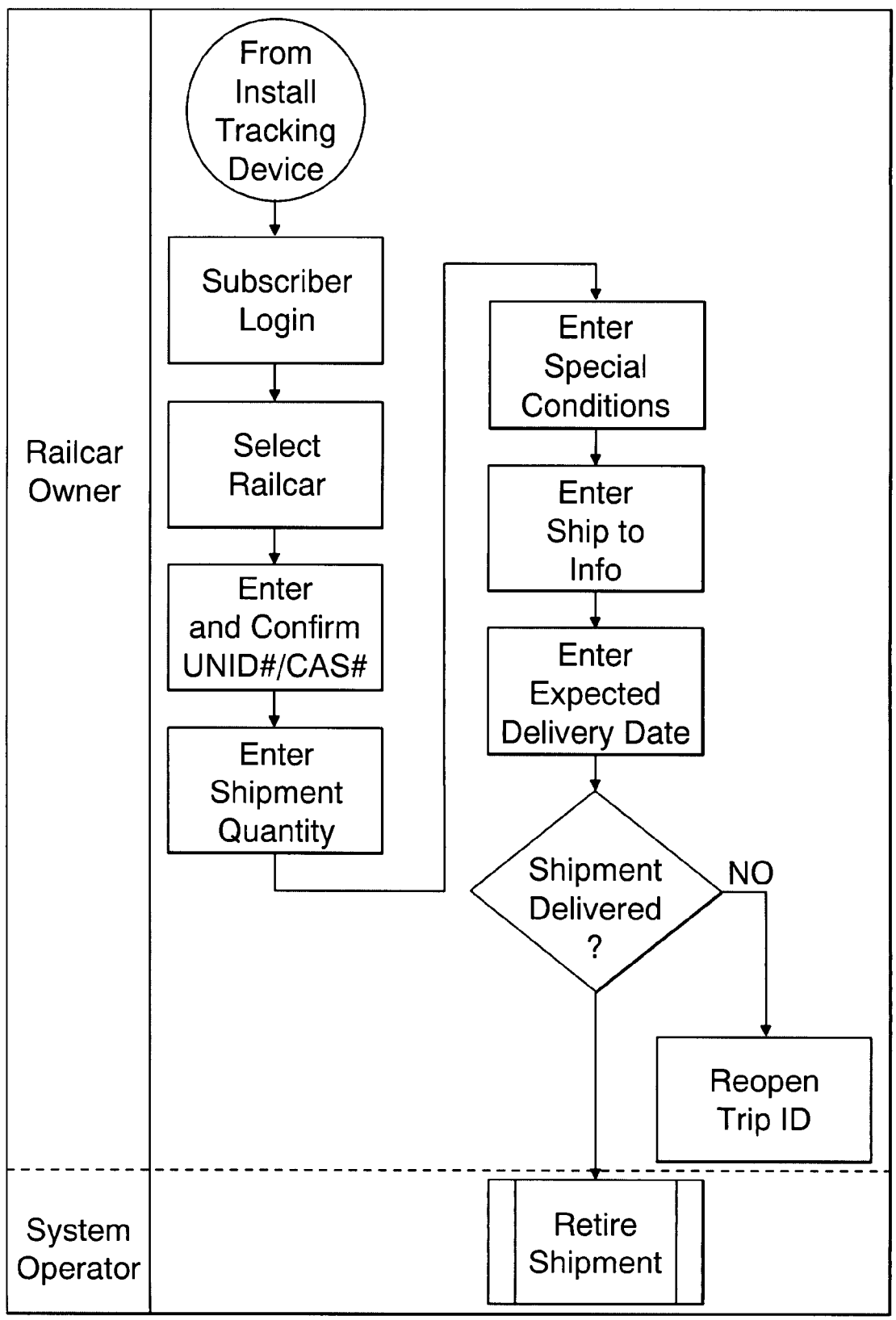
FIG. 4 is a flowchart of the work process for entering shipment data into the system.

The process for entering shipment data is illustrated in FIG. 4. An authorized user logs in, and his Subscriber ID and name are displayed. Only those railcars with installed mobile tracking devices 2 are displayed. The shipment date on the screen defaults to <TODAY>. The railcar owner enters the UNID number or CAS number for the material (e.g., 2055, Styrene Monomer, stabilized). The corresponding product name and hazard class are retrieved from the database, and the user is asked to confirm that the data is correct. The railcar owner enters the quantity of material being shipped (e.g., 186,000 gallons; the unit of measure can be weight or volume). The railcar owner enters any special conditions that may exist for this material (e.g., inhibitor to prevent polymerization; expiry date is entered) and contact information. The railcar owner enters consignee information, e.g., Manufacturer ABC, address, including zip code. This information is geo-coded by the system to establish the "Retire Shipment" business rule. The railcar owner enters expected delivery date.

The retirement process operates by making a determination of shipment delivery to its destination. The GIS software determines the latitude/longitude of the destination, takes the current latitude/longitude of the mobile asset, compares the two latitude/longitude readings, and applies a mathematical formula to determine the distance the mobile asset is from the destination. If the distance is within a pre-defined threshold, the system automatically retires the asset from the tracking system. If the system erroneously retires a shipment prematurely, the subscriber can reverse the "Retire Shipment" indication and internal logistics data will indicate that the shipment has not been delivered.

As an alternative to manual data entry via the data entry screens, the system may provide an interface with a subscriber's logistics system, so that a subscriber may simply export shipment data from its existing logistics system and upload it to the monitoring system. A standard template may be provided so that the subscriber's data can be readily imported into the database of the monitoring system. This provides compatibility with logistics systems widely used by manufacturers and shippers, such as applications available from SAP AG and other vendors, and eliminates the need to manually re-enter the data via the data entry screens.

The system performs several functions to assure the continuous and proper operation of each tracking device 2. For example, the system monitors battery voltage levels for those mobile tracking devices utilizing a battery for internal power. The application regularly monitors the operating temperature of each mobile tracking device and alerts the system operator based on out-of-tolerance limits.

The GIS mapping software provides rendering of the real-time location and historical route of a subscriber's mobile asset of interest on a map on a display. Off-the-shelf information for streets, roads, and other data points of interest is utilized by the system. The GIS software provides a visual change of the mobile asset icon, e.g., its color, denoting the status of the mobile asset as either on its delivery trip to deliver cargo or on its return trip after having delivered its cargo. Geofence configurations set by the subscriber are also displayed on the map.

The system provides the ability to "hover" with the computer mouse over a mobile asset rendered on a map and receive unique information about the asset, which may be displayed in a pop-up window. This information includes, but is not limited to, asset type (railcar, truck, etc), mobile tracking device ID, shipper's name, shipper's address, load information (chemical, etc), hazard class (if a chemical), loaded weight, load expiry (if applicable), asset position (latitude and longitude) with date and time stamp closest street intersection, mobile asset speed and heading (derived from the GPS location information), rail track owner, milepost number, temperature, battery voltage, etc.

The subscriber may select which mobile assets to display by material, hazard category, etc. Preferably, the system provides the subscriber with display options such as "Show all TIH."

The system can also provide other useful and convenient functions. For example, the database may provide the ability to search, display and print Material Data Safety Sheets (MSDSs) for chemical materials for use by shippers, first responders and others. The database preferably contains a table of product codes and a table of UNID and/or CAS numbers for subscriber association to a cargo; this information is preferably available in pick lists on the data entry screens to facilitate shipment data entry by a subscriber.

Figure 5A:
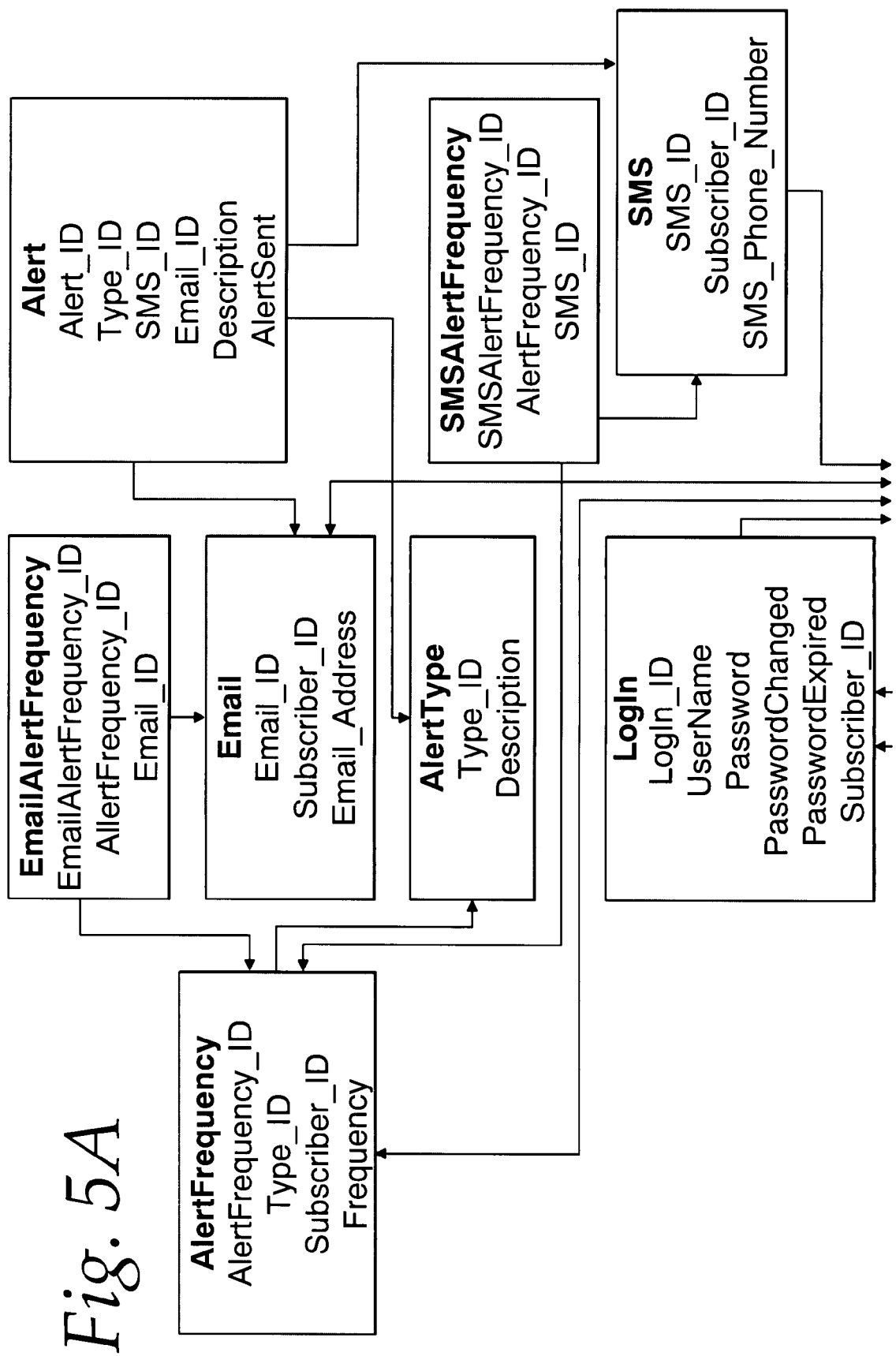
FIG. 5 is a block diagram showing the design of the central database of the system.
Figure 5C:
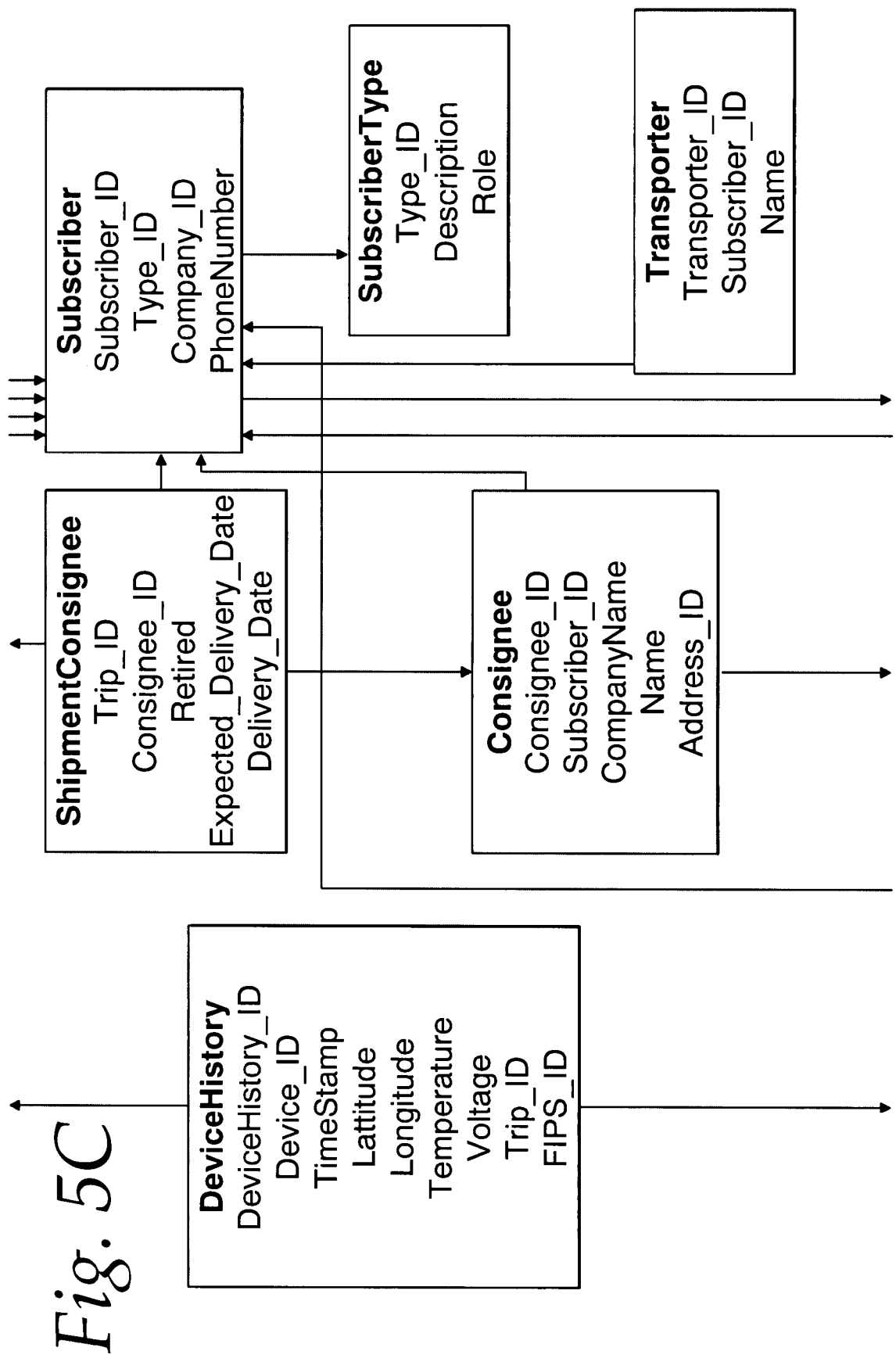
Figure 5D:
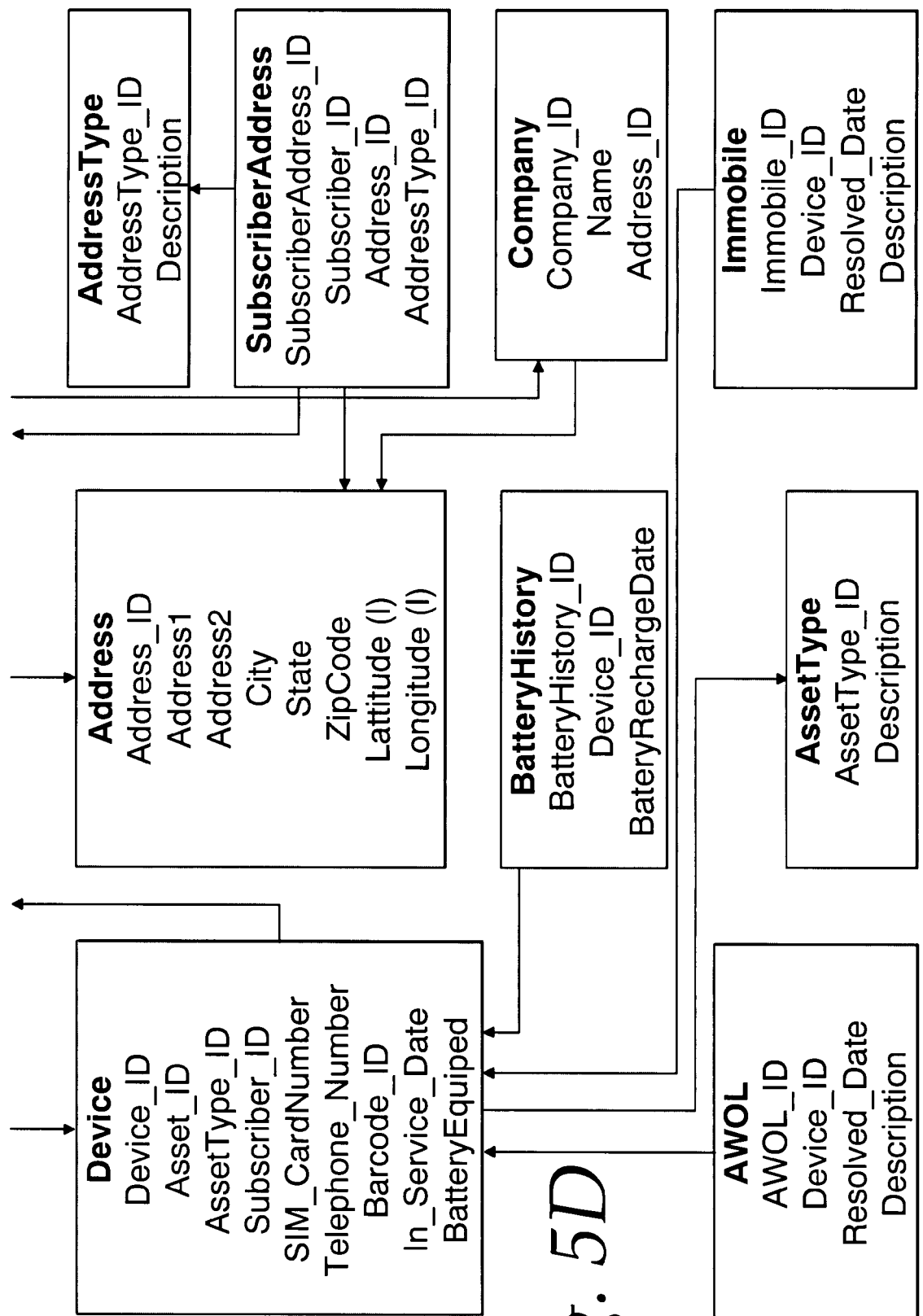

FIG. 5 illustrates a representative example of the overall database design of central server 8 capable of handling all of the types of data required for operation of the system as described.

The foregoing is intended to represent one embodiment of the present invention and is not intended to limit in any way the scope of the invention. Additional modifications and enhancements to the invention may be apparent to those of skill in the art.

We claim:

1. A mobile asset tracking system comprising:
   a plurality of tracking units, each tracking unit being adapted for mounting to a mobile asset of a system subscriber and comprising a position location device, at least one communication device for telemetry data transmission, a battery, a processor and a firmware program for enabling communication between the position location device and the communication device and for controlling a communication interval of the communication device and a position lock interval of the position location device; and a monitoring system comprising:
- a port listener for receiving telemetry data from the tracking units, the telemetry data including the position of the mobile asset as determined by the position location device;
- a database for receiving and storing telemetry data from the port listener;
- a database rules engine for deriving asset and shipment cargo information from the telemetry data in the database and generating alerts based on the asset information and defined rules;
- an interface program for interacting with the database rules engine and sending alerts to the system subscriber; and
- a graphical user interface (GUI) which may be accessed by the system subscriber via a secure internet connection.

2. The system of claim 1 wherein the firmware comprises an interface program for changing the communication interval and position lock interval, the firmware being remotely programmable to change said intervals.

3. The system of claim 1 wherein the GUI comprises interactive software which allows a subscriber to view the real time position locations of the mobile assets.

4. The system of claim 1 wherein the GUI comprises interactive software which allows a subscriber to configure subscriber master data.

5. The system of claim 1 wherein the tracking unit comprises at least one sensor for detecting at least one mobile asset parameter.

6. The system of claim 5 wherein the sensor is a temperature sensor and the parameter is a temperature.

7. The system of claim 5 wherein the sensor is a voltage sensor and the parameter is the voltage of a battery.

8. The system of claim 7 wherein the firmware includes a power management component for monitoring a battery voltage sensed by the voltage sensor and inhibiting battery discharge by overriding the communication interval to a longer communication interval should the battery voltage drop below a threshold level.

9. The system of claim 1 wherein the position location device is a GPS positioning module with an antenna.

10. The system of claim 1 wherein the tracking unit further comprises an outer protective case having a solar panel mounted thereon and electrically connected to the battery for continuous charging of the battery.

11. The system of claim 10 wherein the tracking unit further comprises a float charger to prevent overcharging of the battery by the solar panel.

12. The system of claim 10 wherein the firmware includes a power management component for disabling operation of the communication device while maintaining power to the position location device for obtaining position locks, until the solar panel has recharged the battery to a nominal power threshold.

13. The system of claim 12 wherein, once the solar panel has recharged the battery to an acceptable voltage level, the original communication interval is restored.

14. The system of claim 1 wherein the communication device is a cellular communication module with an antenna.

15. The system of claim 1 wherein the tracking unit further comprises internal flash memory for storing extended position location data from the position location device in the event a communication connection cannot be established between the communication device and the monitoring system.

16. The system of claim 1 wherein the graphical user interface comprises a plurality of configuration screens for tracking unit management, association of a tracking unit with the subscriber, setting and viewing alert configurations, entering and viewing shipment data for a mobile asset, and maintenance of subscriber master data.

17. The system of claim 16 wherein the monitoring system has a system architecture comprising at least one central server for storing application programs, subscriber master data and configurations for the subscriber; a database management system (DBMS) utilizing a relational database; IIS services for allowing the subscriber to access the system through Web enabled applications, and Graphical Information System (GIS) mapping software for graphical display of the subscriber's mobile asset being tracked.

18. The system of claim 16 wherein the alert table configuration screen permits the subscriber to configure one or more proactive alerts from the tracking unit associated with the mobile asset.

19. The system of claim 18 further comprising a configuration screen allowing entry of multiple users to receive alerts.

20. The system of claim 19 further comprising a configuration screen having a pick list of alerts each user will receive.

21. The system of claim 18 further comprising a configuration screen having a pick list of alert frequency parameters for each chosen alert.

22. The system of claim 18 further comprising a back end functionality component for automatically resetting alert frequency parameters and the communication interval to the appropriate setting based on an identification of a shipment cargo in the mobile asset.

23. The system of claim 22 wherein the shipment cargo is a chemical and the identification is the cargo's UNID or CAS number.

24. The system of claim 22 wherein the shipment cargo is a chemical and the identification is the cargo's hazardous material classification.

25. The system of claim 16 wherein the configurable alerts are selected from the group consisting of:
- a mobile asset that has not moved for a pre-configured amount of time;
- an inhibitor preventing premature chemical polymerization approaching its expiration;
- a mobile asset has broken a defined application geo-fence;
- a mobile asset is projected to arrive late at its consignee's destination address;
- a mobile asset with a hazardous cargo has entered or is approaching a geographic area with a population density above a predefined threshold;
- a mobile asset with a hazardous cargo is within a specific distance from a predefined facility of interest;
- a special alert status and business rules for shipments carrying extremely hazardous substances;
- a special alert status and business rules for shipments for an asset carrying a Toxic Inhalation Hazard/Poisonous Inhalation Hazard (TIH/PIH);
- a tracking unit associated with a mobile asset has not successfully communicated with the monitoring system for a pre-configured amount of time; and
- a tracking unit's battery level is approaching a first threshold of power management intervention.

26. The system of claim 16 wherein a subscriber can suppress alerts by transmitting from a computer, personal digital assistant (PDA) or other communication device a command to suppress alerts from a specific tracking unit.

27. The system of claim 26 wherein when a new shipment is entered by the subscriber for a tracking unit whose previous alerts were suppressed, the system will reset the subscriber's originally configured alert requests to the original settings set by the subscriber.

28. The system of claim 16 wherein as the database rules engine processes data received from the tracking units via the port listener, the database rules engine examines incoming data for subscriber alert conditions by accessing an alert table defined by the subscriber, and when an alert is detected, the interface program generates and sends the alert to the subscriber via a communication protocol.

29. The system of claim 16 wherein the shipment data comprises one or more types of information selected from the group consisting of load type, UNID number, CAS number, cargo expiration date, weight of load, customer shipment delivered to, shipment destination, shipment estimated arrival date, asset type, chemical inhibitor expiration date, and bill of lading.

30. The system of claim 16 wherein the shipment data can be edited allowing for mobile asset diversion to a different consignee should the subscriber decide product diversion is required.

31. The system of claim 16 further comprising
a product code table unique to each subscriber;
a universal carrier table;
a UNID number and CAS number table containing hazardous materials including TIH/PIH along with the material's associated hazard class/division; and
at least one screen for management of subscriber devices and association and disassociation of a tracking unit to the subscriber's mobile asset.

32. The system of claim 17 wherein the GIS mapping software provides:
a map rendering of key geographical data;
an historical route rendering for the mobile asset;
a mobile asset icon showing the location of the mobile asset on the map rendering;
a visual color change of the mobile asset icon denoting the status of the mobile asset as either on its delivery trip to deliver cargo or on its return trip after having delivered its cargo;
a hover capability over the mobile asset icon for displaying a pop-up window with unique information about the mobile asset; and
geofence configurations set by the subscriber.

33. The system of claim 32 wherein the pop-up window displays information about the asset selected from the group consisting of asset type, asset identification number, shipper's name, shipper's address, load information, hazard class, loaded weight, expiration date, asset longitude/latitude with date and time stamp, closest street intersection, asset heading, asset speed, track owner, milepost number, and identification of party with physical custody and control of asset.

34. The system of claim 17 further comprising auto-retirement for a shipment once the mobile asset approaches the shipment destination, wherein determination of shipment delivery to the destination is accomplished through the GIS software by:
determining the latitude/longitude of the destination;
taking the current latitude/longitude of the mobile asset;
comparing the two latitude/longitude readings and applying by the processor a mathematical formula to determine the distance the mobile asset is from the destination, and, if the distance is within a pre-defined threshold, automatically retiring the asset from the tracking system.

35. The system of claim 1 wherein the database comprises multiple subscriber databases in a parent-child relationship, keeping each subscriber's information unique and separate through application security.

36. The system of claim 1 wherein the mobile asset is a rail car.

37. The system of claim 1 wherein the mobile asset is an intermodal cargo container.

38. The system of claim 1 wherein the mobile asset is a truck trailer.

39. The system of claim 1 wherein the subscriber is a party selected from the group consisting of a manufacturer of hazardous chemicals or other material, a consignee who receives hazardous chemicals or other material, a railroad carrier, a trucking company, and a community.

40. The system of claim 1 wherein the alerts are sent via email or SMS text to a subscriber's computer.

41. A method for tracking mobile assets containing hazardous chemical cargo comprising:
providing a series of software business rules for monitoring the characteristics of the hazardous chemical cargo;
providing a graphical user interface having a series of screens for entry of hazardous chemical cargo data;
providing at least one alert triggered by application of the business rules against the hazardous chemical cargo data;
defining a business rule for monitoring the hazardous chemical's inhibitor expiration;
defining a business rule for monitoring whether the hazardous chemical is sitting idle near a prescribed population density, school, or other High Threat Urban Area (HTUA); and
providing mobile tracking devices which transmit data for the mobile assets and defining a business rule that will automatically change device transmission times for a mobile tracking unit to the shortest transmit when a unit that was previously affixed to a mobile asset carrying non-hazardous cargo is moved to a mobile asset containing hazardous chemical cargo.

42. The method of claim 41 further comprising entering via the data entry screens a hazardous chemical's characteristics via a standard UNID/CAS number identifying the cargo's Toxic Inhalation/Poisonous Inhalation Hazard (TIN/PIN).

43. The method of claim 42 further comprising automatically updating the hazardous chemical cargo data with the party which currently has physical custody and control of the mobile asset.

44. The method of claim 42 further comprising entering via the data entry screens an expiration date for the hazardous chemical's inhibitor.

45. The method of claim 42 further comprising providing a database which contains UNID/CAS numbers for user association, via the graphical user interface, to the hazardous chemical cargo.

46. The method of claim 41 wherein unique, configurable alerts are chosen by the subscriber and sent to the subscriber's email address or Personal Digital Assistant (PDA), the alerts providing at least one alert selected from the group consisting of:
an alert that the hazardous cargo being tracked has entered an HTUA;
an alert that the hazardous cargo is located in a population density threshold and has not moved for a pre-determined amount of time;
a series of progressive alerts that the hazardous cargo's chemical inhibitor is approaching expiration;

a special alert for hazardous cargo classified as TIH/PIH; and a special alert for hazardous cargo classified as an Extremely Hazardous Substance.

47. A method for tracking mobile assets comprising:

providing a plurality of tracking units, each tracking unit being adapted for mounting to a mobile asset of a system subscriber and comprising a position location device, at least one communication device for telemetry data transmission, a battery, a processor and a firmware program for enabling communication between the position location device and the communication device and for controlling a communication interval of the communication device and a position lock interval of the position location device;

providing a monitoring system comprising:
- a port listener for receiving telemetry data from the tracking units, the telemetry data including the position of the mobile asset as determined by the position location device;
- a database for receiving and storing telemetry data from the port listener;
- a database rules engine for deriving asset and shipment cargo information from the telemetry data in the database and generating alerts based on the asset information and defined rules;
- an interface program for interacting with the database rules engine and sending alerts to the system subscriber; and
- a graphical user interface (GUI) which may be accessed by the system subscriber via a secure internet connection, the GUI having a series of data entry screens for user entry of logistics data;

providing a series of software business rules executable by the database rules engine for monitoring logistics data; and providing at least one alert triggered by application of the business rules against the logistics data.

48. The method of claim 47 further comprising entering via the data entry screens a shipment's expected time of delivery.

49. The method of claim 47 further comprising automatically updating the expected time of delivery based on the asset's average rate of speed and the remaining distance to travel.

50. The method of claim 47 further comprising automatically updating the asset's utilization and reporting overall fleet utilization to the subscriber.

51. The method of claim 47 wherein unique, configurable alerts are chosen by the subscriber and sent to the subscriber's email address or Personal Digital Assistant (PDA), the alerts providing at least one alert selected from the group consisting of:
- a mobile asset is projected to arrive late at its consignee's destination address;
- an alert that the asset has arrived at its consignee's destination address;
- an alert that the asset has not moved for a pre-determined amount of time after it has arrived at its consignee's destination address and may be subject to demurrage fees and;
- an alert that the asset has arrived on the return trip at its point of origin destination address.

* * * * *